Figure 1:
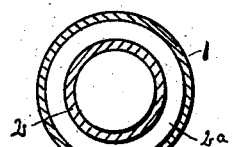

No. 763,010. PATENTED JUNE 21, 1904.
W. E. MEREDITH.
HOSE COUPLING.
APPLICATION FILED NOV. 27, 1903.

NO MODEL.

Witnesses:
R. E. Randle.
Robt. L. Stearn.

Inventor,
W. E. Meredith,
By his attorney,
Robert W. Randle.

No. 763,010. Patented June 21, 1904.

UNITED STATES PATENT OFFICE.

WILLIAM E. MEREDITH, OF RICHMOND, INDIANA, ASSIGNOR OF ONE-HALF TO CHARLES W. HECKMAN, OF RICHMOND, INDIANA.

HOSE-COUPLING.

SPECIFICATION forming part of Letters Patent No. 763,010, dated June 21, 1904.

Application filed November 27, 1903. Serial No. 182,709. (No model.)

*To all whom it may concern:*

Be it known that I, WILLIAM E. MEREDITH, a citizen of the United States, residing in the city of Richmond, in the county of Wayne, and in the State of Indiana, have invented new and useful Improvements in Hose-Couplings, of which the following is a lucid specification, which I declare to be a full, clear, and complete description of the invention, such as will enable others skilled in the art to which it appertains to make and use the same.

This present invention has particular reference to a device for uniting the ends of rubber hose or pipes to connect their interior space to form a continuous line of hose composed of a plural number of sections.

The object of the invention, broadly speaking, is to provide a very simple and practical device by the employment of which rubber hose or the like may be easily and quickly connected for passage therethrough of aqueous elements.

A more specific object is to provide a new article of manufacture in a hose-coupling, by which the raw or unprepared ends of hose may be abuttedly connected very quickly and form a pressure and water proof joint which may be quickly disconnected when desired.

Another object is to provide a hose or tubing coupling of a single device which can be manufactured and sold at a comparatively low price and the efficacy of which will be manifest.

Other specific objects and advantages of my invention will be made manifest in the following specification, and the construction will be visualized in the accompanying drawings.

My invention consists, primarily, in a hose-coupler embodying certain new and useful features and details of construction and the relative disposition of the coöperating parts, substantially as hereinafter particularly set forth, illustrated in the drawings, and incorporated in the appended claim.

The invention relates to a hose-coupling constructed substantially as shown in the drawings, in which—

Figure 2:
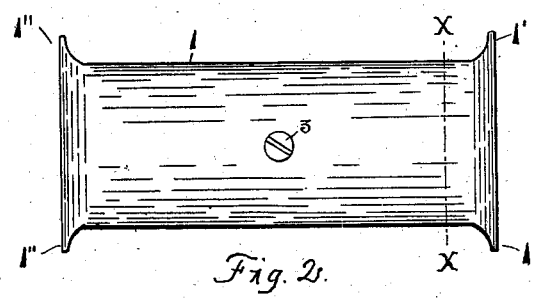
Figure 3:
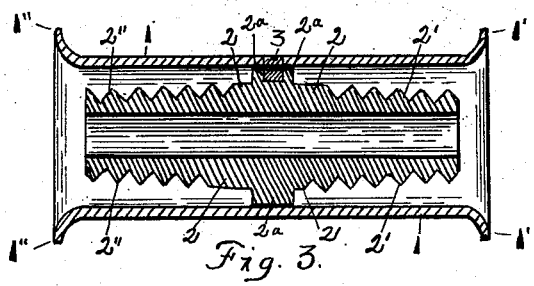
Figure 4:
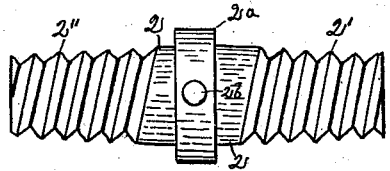
Figure 5:

Figure 1 is a cross-section of my invention, taken on the line X X of Fig. 2. Fig. 2 is an outside plan view of my device. Fig. 3 is a longitudinal central section of the invention. Fig. 4 is a detail view of the core of the device disconnected, and Fig. 5 is a detail view of the screw for securing the core within the casing.

Similar indices refer to and denote like parts throughout the several views of the drawings.

For a more accurate and comprehensive understanding of my invention I will now take up the detail description thereof, which I will refer to as briefly and compactly as I may.

In the drawings the numeral 1 denotes the outer casing or shell of my device, which consists of a relatively thin metal tube of an inner diameter infinitesimally greater than the outer diameter of the hose to be used.

The numeral 2 denotes a cone-like core having a central aperture longitudinally therethrough for an aqueduct and having the right and left end portions of its periphery provided with coarse V-shaped right and left hand or both right or both left hand spiral threads 2' and 2'', respectively. Integral with the body of the core 2, extending therearound, rising therefrom, and of an outside diameter substantially the same as the inside diameter of the casing 1, is the annulet $2^a$, as shown in Figs. 3 and 4, said annulet having a cavity-like screw-hole $2^b$ extending thereinto from its periphery centerward to receive the screw 3. Through one side of the longitudinal center of the casing 1 is an aperture to receive the screw 3 therethrough. It will now be seen that the core may be placed within the casing, as shown in Fig. 3, the annulet $2^a$ contacting with the inner wall of the casing, forming a central partition, the core being turned to bring the screw-hole $2^b$ on alinement with said central aperture in the casing 1', and the screw 3 is then inserted in said hole and aperture and run down until its face is flush with the outside of the casing, as shown in the drawings. The ends of the hose may now be inserted in the ends of the casing 1 between the inner wall of the casing and the threads 2' and 2'' of the core, and then by turning the device or the hose the said threads will engage and draw the ends of the hose inward until they are sufficiently tightened. It will be noticed that the shell will tend to clamp the ends of the hose tightly in engagement with said threads and prevent the ends of the hose from spreading.

In order to facilitate the entry of the ends of the hose in the ends of the casing, I prefer to extend the ends of the casing funnel-like, as in Figs. 2 and 3, forming the integral flanges 1' and 1'' as segments of a circle or sectors by which the ends of the hose are guided into the spaces between the shell and the core, as will be apparent.

It will be seen that my device is very simple yet effective and by the employment of which the ends of hose or the like may be quickly connected or disconnected without a special preparation of the ends of the hose and without the employment of tools and that a smooth and mechanical joint will be formed which will be impervious to water.

From the above description, taken in connection with the accompanying drawings, it will be apparent that I have produced an improved hose-coupling embodying and attaining the objects otherwhere referred to in this specification.

While I have shown and described the best means to me known at this time for carrying out my invention in a practical manner, I desire it to be understood that I do not restrict myself to the exact details of the construction shown and described, but hold that any changes or variations therein as would suggest themselves to the ordinary mechanic would clearly fall within the limits and scope of my invention.

Having now fully shown and described my invention and the best means for its construction to me known at this time, what I claim, and desire to secure by Letters Patent of the United States, is—

A hose-coupling comprising in combination, a cylindrical casing having flaring funnel-like ends, the flaring ends formed integral with said casing, a cylindrical tapering hollow core of less length and diameter than the said casing, a narrow annulet integral with, central of, and extending entirely around said core with its periphery adapted to neatly fit the interior of said casing, a screw passing through an aperture in the wall of said casing and entering said annulet for securing said core in position in the casing, threads formed around each of the tapering portions of the core extending from said annulet to the respective ends of the core, all substantially as shown and described.

In testimony whereof I have hereunto signed my name to this specification in the presence of two subscribing witnesses.

WILLIAM E. MEREDITH.

Witnesses:
R. W. RANDLE,
R. E. RANDLE.